United States Patent
Di Gregorio et al.

(10) Patent No.: US 7,590,117 B2
(45) Date of Patent: Sep. 15, 2009

(54) MULTICHANNEL PROCESSOR (75) Inventors: Lorenzo Di Gregorio, Munich (DE);
Jinan Lin, Ottobrunn (DE); Xiaoning Nie, Munich (DE); Thomas Wahl, Fulda (DE)

(73) Assignee: Infineon Technologies AG, Munich (DE)

( * ) Notice: Subject to any disclaimer, the term of this patent is extended or adjusted under 35 U.S.C. 154(b) by 861 days.

(21) Appl. No.: 10/745,934

(22) Filed: Dec. 23, 2003

(65) Prior Publication Data
US 2004/0184457 A1 Sep. 23, 2004

(30) Foreign Application Priority Data
Dec. 23, 2002 (DE) ................. 102 60 604

(51) Int. Cl.
H04L 12/28 (2006.01)
H04L 12/56 (2006.01)
(52) U.S. Cl. ................. 370/392; 389/259; 389/360; 389/394
(58) Field of Classification Search ................. 370/392, 370/389, 398, 351, 354, 360, 371, 372, 375, 370/383, 353; 709/232, 246
See application file for complete search history.

(56) References Cited

U.S. PATENT DOCUMENTS

| 5,721,833 | A  | * | 2/1998  | Cooperman et al. | 710/56  |
|-----------|----|---|---------|------------------|---------|
| 5,841,771 | A  | * | 11/1998 | Irwin et al.     | 370/360 |
| 6,160,811 | A  | * | 12/2000 | Partridge et al. | 370/401 |
| 6,480,489 | B1 | * | 11/2002 | Muller et al.    | 370/389 |
| 6,711,153 | B1 | * | 3/2004  | Hebb et al.      | 370/351 |
| 7,079,538 | B2 | * | 7/2006  | Gazsi et al.     | 370/392 |
| 2002/0198687 | A1 | * | 12/2002 | Dewan et al. | 702/189 |
| 2003/0035430 | A1 | * | 2/2003  | Islam et al. | 370/401 |
| 2003/0189931 | A1 | * | 10/2003 | Barri et al. | 370/389 |

FOREIGN PATENT DOCUMENTS

| WO | WO 01/16777 A1 | 3/2001  | ................. 709/246 |
| WO | WO 01/77849 A2 | 10/2001 | ................. 709/232 |

OTHER PUBLICATIONS

"Power Network Processor, Resource Manager," IBM Corporation, © 2000, (2 pages).
Norris, David L. "IBM Network Processor Overview," IBM Corporation, © 2001, (62 pages).

* cited by examiner

Primary Examiner—Ricky Ngo
Assistant Examiner—David Oveissi
(74) Attorney, Agent, or Firm—Maginot, Moore & Beck (57) ABSTRACT An arrangement and a method for processing data of multi-protocol data packets comprises at least one multiplexer connected to input ports; at least one first programmable data processing unit configured to provide header words and into payload words; a buffer management unit configured to generate localization data which specifies a corresponding memory area of the payload memory; a descriptor generator unit for generating data packet descriptors; a RISC processor configured to generate, in dependence on the data packet descriptors, header data for transmit data packets and payload processing instructions for processing data of the data packet payload words, stored in the payload memory, of the associated received data packet; and at least one second programmable data processing unit configured to process the payload words from the payload memory in accordance with the payload processing instructions and assembles the payload words with the header data to form transmit data packets.

23 Claims, 10 Drawing Sheets

MULTICHANNEL PROCESSOR

FIELD OF THE INVENTION

The invention relates to a multichannel processor for processing data of multiprotocol data packets.

BACKGROUND

Figure 1:
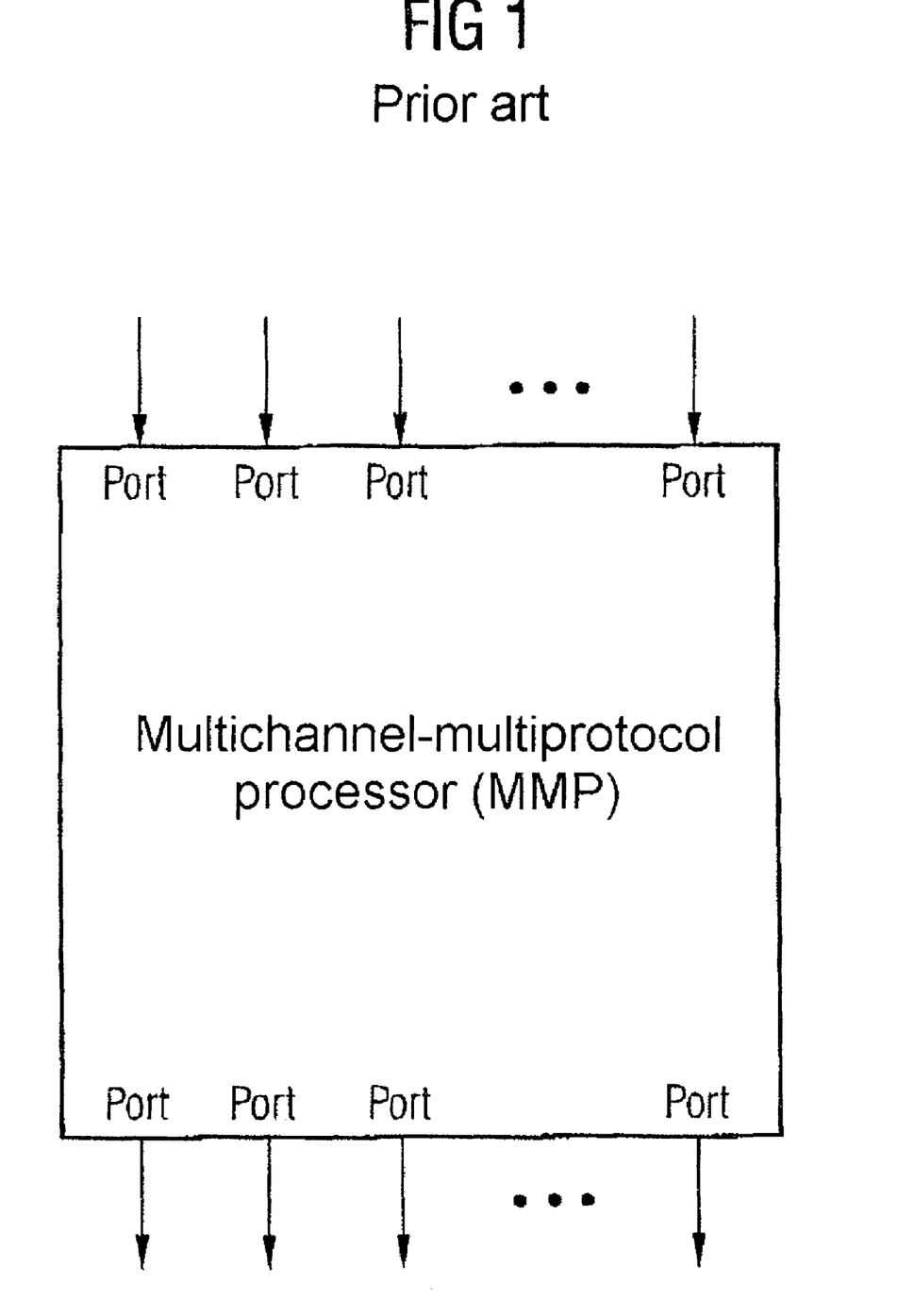
FIG. 1 shows a multichannel-multiprotocol processor of the prior art.

FIG. 1 shows a multichannel-multiprotocol processor (MMP) of the prior art. In data networks, it is necessary in many applications to process sequences of data packets with different data packet protocols and with different data frame formats. As such, the data packets are received or transmitted by the multichannel processor via different data transmission channels. For this purpose, the multichannel-multiprotocol processor has input ports for the parallel reception of received data packets and output ports for transmitting transmit data packets. The multichannel processor performs data processing of the received data packets. This data processing typically comprises the fragmentation of large data packets to form transmit data packets of smaller data volume or, respectively, the assembly of a multiplicity of smaller data packets with a smaller data volume to form data packets having a large data format.

Figure 2:
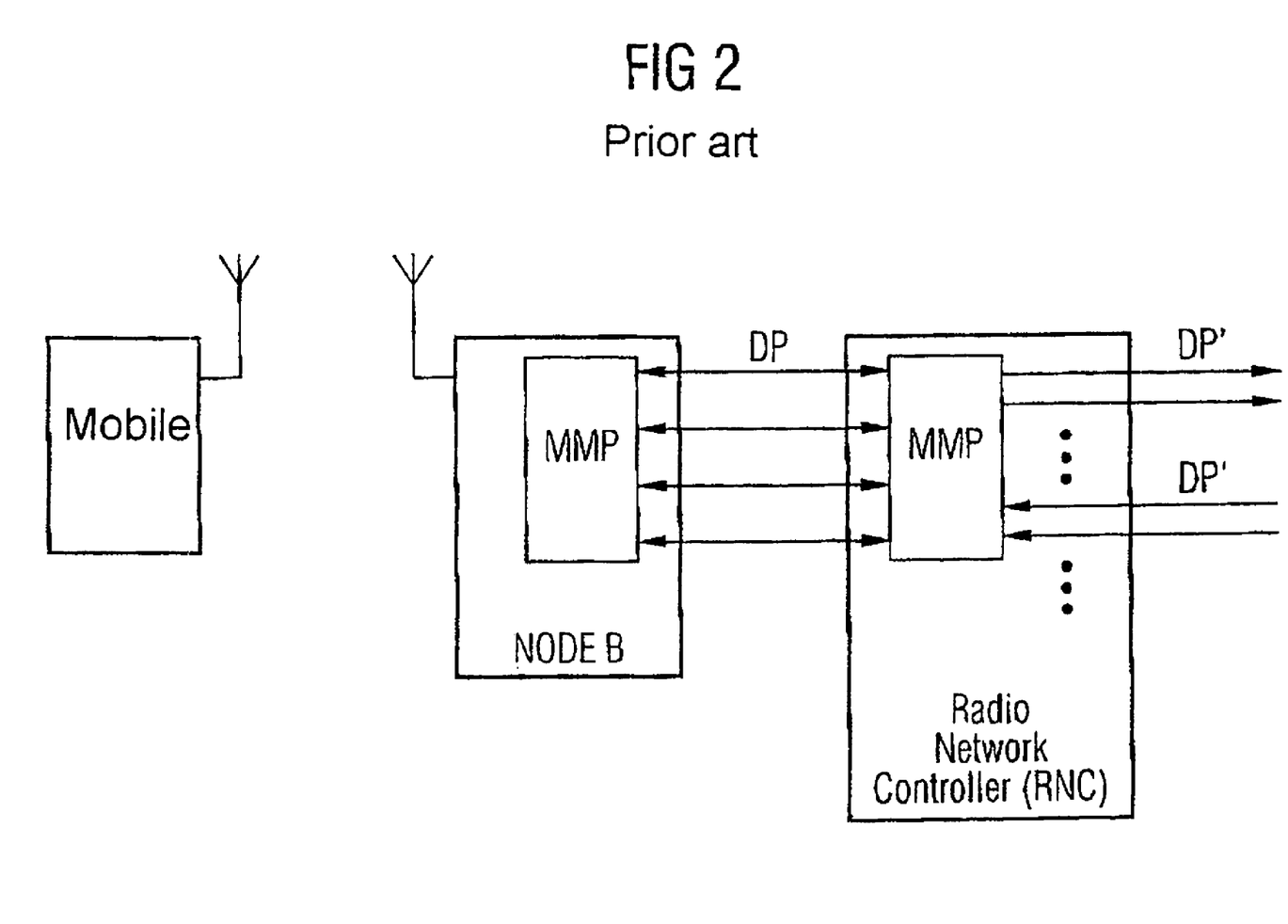
FIG. 2 shows a circuit arrangement in which multichannel-multiprotocol processors are used in accordance with the prior art.

FIG. 2 shows a typical application for a multichannel-multiprotocol processor of the prior art. In the field of application shown in FIG. 2, a multichannel processor of the prior art is located in a UMTS transmission node B and in a radio network controller RNC which are connected to one another hardwired via data transmission lines. The UMTS transmission node receives data via a wireless transmission link from a mobile telephone and conducts data packets consisting of header and payload via data transmission lines to the corresponding multichannel-multiprotocol processor MMP within the radio network controller RNC. The transmission time necessary for transmitting data between the two multichannel-multiprotocol processors is a result of the ratio of the packet length and the predetermined data transmission rate.

Transmission time (ÜZ)=data packet length (bits): data transmission rate (megabits per second).

To reduce the transmission time ÜZ at the predetermined data transmission rate, the relatively large data packets are fragmented or taken apart in the multichannel-multiprotocol processor of the UMTS data transmission node B. In the example shown in FIG. 2, the large data packets are split into four data packet fragments and transmitted in parallel through four data transmission lines to the multichannel-multiprotocol processor within the radio network controller RNC. This results in a reduction of the data transmission time by a factor of 4. A typical data transmission rate in the example of the prior art shown in FIG. 2 is 2 megabits per second.

Figure 3:
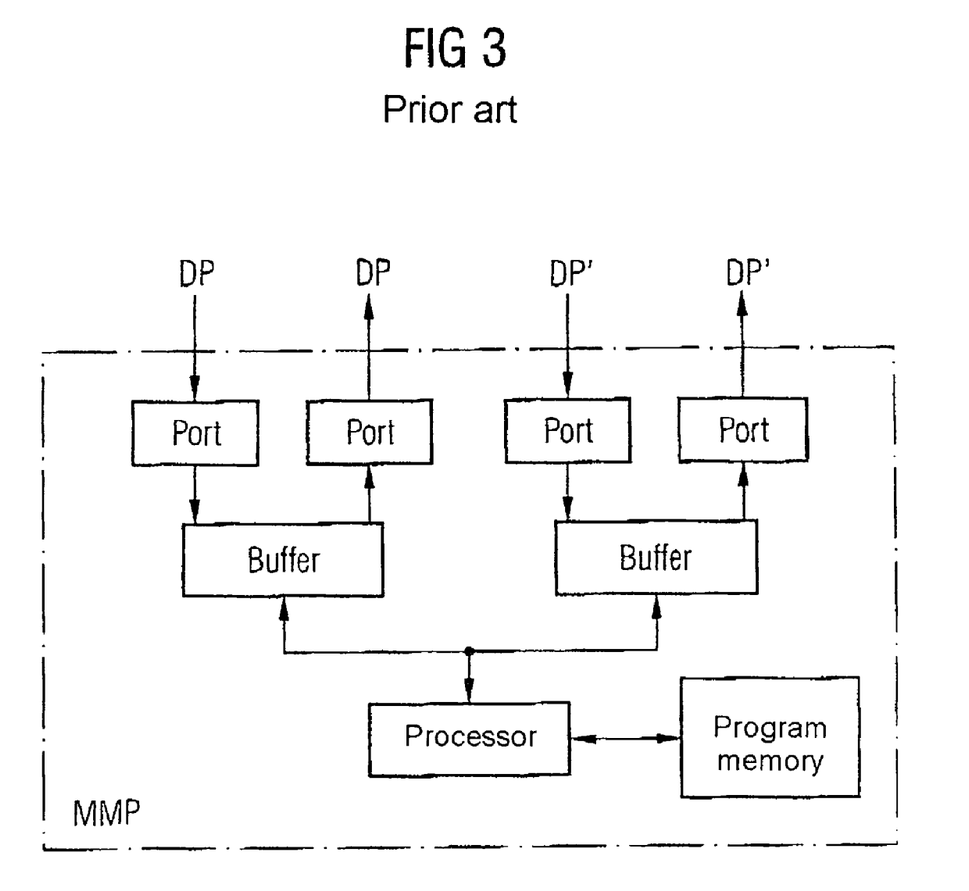
FIG. 3 shows a first computer architecture for a multichannel-multiprotocol processor of the prior art.

FIG. 3 shows a first computing architecture of a multichannel-multiprotocol processor of the prior art. A microprocessor is connected via buffers to input ports for receiving data packets and to output ports for transmitting transmit data packets. Data packets of different size are received, for example, by the multichannel-multiprotocol processor via corresponding input ports and temporarily stored as raw data in the buffer. The microprocessor accepts the received data packets via an internal processor bus and processes them in accordance with a program stored in a program memory, for the data processing of the received data packet. The processed data packet is then delivered to the corresponding output port via the processor bus and the buffer. The computing architecture shown in FIG. 3 makes it possible to process data packets with any data packet protocols and with any data packet formats, i.e. the computing architecture shown in FIG. 3 provides very great flexibility in the data processing. However, the MMP computing architecture shown in FIG. 3 has some serious disadvantages. The processor used is a full microprocessor with an extensive set of instructions. The circuit complexity is, therefore, very high for the MMP processor as shown in FIG. 3. The MMP processor according to FIG. 3 requires a large chip area due to the high circuit complexity of the processor. In addition, the power consumption of the MMP processor shown in FIG. 3 is very high. The data processing in the MMP processor shown in FIG. 3 is carried out in accordance with the software programs stored in the program memory. The software implementation of the multichannel-multiprotocol data processing of data packets is not suitable, in particular, for line card applications with very high data transmission rates. The MMP computing architecture shown in FIG. 3 is too slow for many applications.

Figure 4:
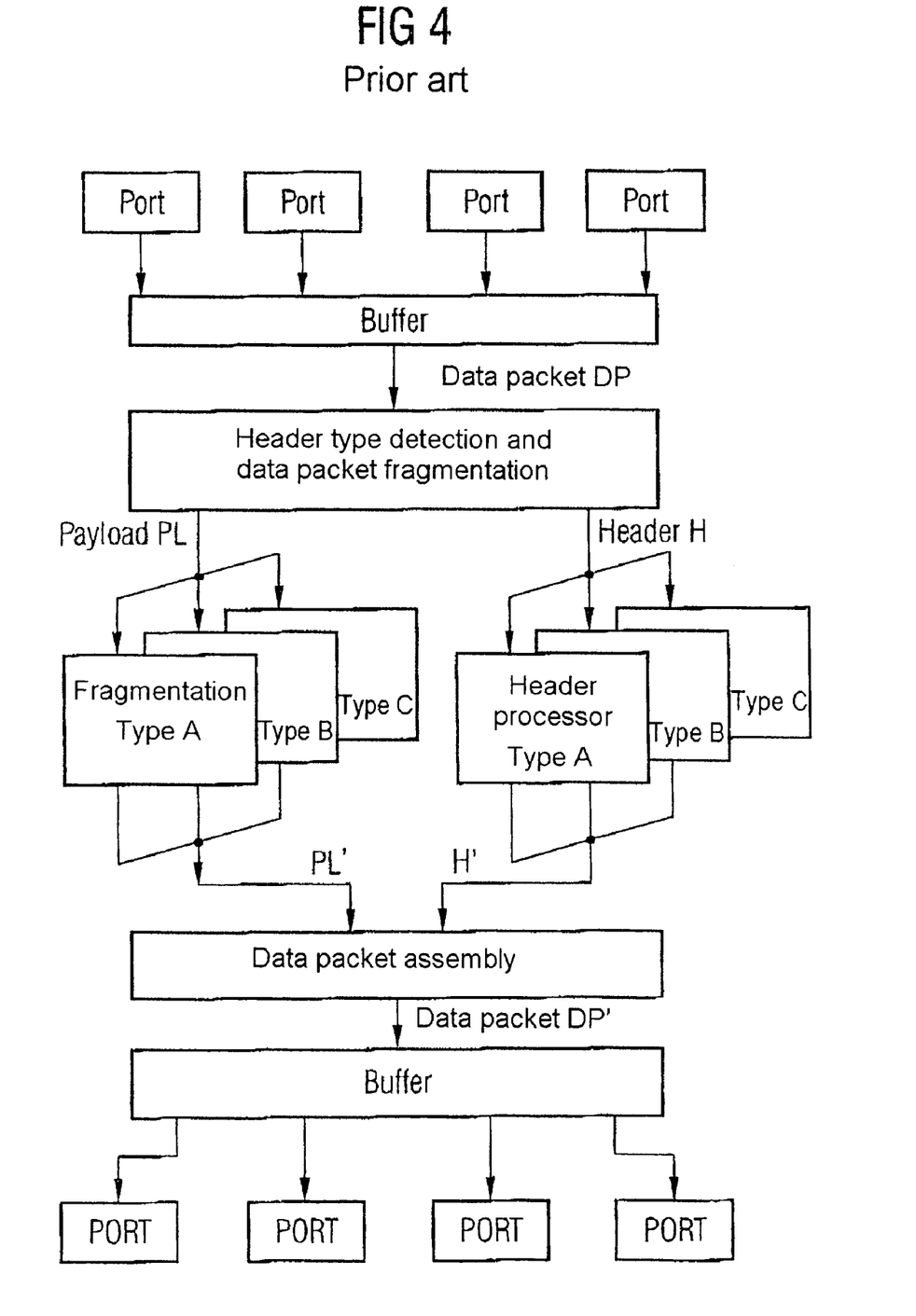
FIG. 4 shows a second computer architecture for a multichannel-multiprotocol processor of the prior art.

FIG. 4 shows an alternative multichannel-multiprotocol processor computer architecture of the prior art. In the circuit arrangement shown in FIG. 4, received data packets are read in in parallel via the input ports and stored in a buffer. The data packets in each case comprise header and payload. In an identification circuit, the header data of the different data packets are compared with predetermined headers which are stored, for example, in a memory, and if the header type is known or stored, the received buffered data packet is correspondingly processed. The data processing consists, for example, of a fragmentation of a large data packet into a multiplicity of smaller data packets as shown in FIG. 4. As an alternative, the data processing can also consist of an assembly of many small data packets to form a large data packet. The data packet is split into header H and payload PL in accordance with the detected header type and supplied to the hardwired fragmentation circuit and header data processing circuit allocated to the header type detected. The processed header data H' and the processed payload PL' are then assembled again and buffered in an output data buffer as transmit data packets DP'. The assembled transmit data packets are then output via an assigned output port. The computer architecture for a multichannel-multiprotocol processor as shown in FIG. 4 has the serious disadvantage that data processing of data packets having an unknown header type is not possible. The data processing circuits, e.g. the fragmentation circuits for processing the payload, are hardwired. If the header type cannot be detected by the detection circuit, there is no further data processing. The computing architecture shown in FIG. 4 has relatively little circuit complexity and low power consumption. However, there is no flexibility whatsoever with respect to the multiprotocol data packets to be processed.

It is, therefore, the object of the present invention to create a multichannel-multiprotocol processor for processing data of multiprotocol data packets which, on the one hand, is capable of flexibly processing data packets with novel protocols and, on the other hand, has very little circuit complexity.

SUMMARY OF THE INVENTION

Embodiments of the invention include a multichannel processor arrangement for processing data of multiprotocol data packets, comprising:
(a) a number of input ports for receiving received data packets in parallel, which can be selected in each case by means of an input port number;
(b) at least one multiplexer connected to the input ports, which switches through the data present at the selected input port word by word;

(c) at least one first programmable data processing unit (reader), which separates the sequence of data words switched through by the multiplexer into data packet header words and into data packet payload words in accordance with a sorting program selected in accordance with the input port number;

(d) a buffer management unit (BMU) which writes the data packet payload words of a received data packet into an addressable payload memory and generates localization data which specify the corresponding memory area;

(e) a descriptor generator unit for generating data packet descriptors which in each case contain a header assembled from the data packet header words and the localization data for the associated payload of the received data packet;

(f) an RISC processor which generates, in dependence on the data packet descriptors, payload processing instructions for processing data of the data packet payload words, stored in the payload memory, of the associated received data packet;

(g) at least one second programmable data processing unit (writer), which processes the payload words, read out of the payload memory by the buffer management unit (BMU), in accordance with the payload processing instruction to form transmit data packets;

(h) at least one demultiplexer which switches the transmit data packets through to an output port selected by means of an output port number, and comprising (i) a number of output ports for outputting the transmit data packets in parallel.

In a preferred embodiment of the multichannel processor, the RISC processor generates headers for the transmit data packets in dependence on the data packet descriptors.

In a preferred embodiment of the multichannel processor according to the invention, a control unit is provided which delivers the input port number to the multiplexers and the output port number to the demultiplexers.

The two data processing units in each case preferably have a program memory.

In a preferred embodiment, the data processing units can be programmed by the RISC processor.

In a first embodiment of the multichannel processor according to the invention, the data processing units are programmed during the processor configuration.

In an alternative embodiment of the multichannel processor according to the invention, the data processing units are programmed during the ongoing processor operation.

In a preferred embodiment of the multichannel processor according to the invention, the descriptor generator unit marks an invalid received data packet by means of a corresponding entry in the data packet descriptor.

The second programmable data processing unit (writer), when receiving a payload processing instruction for assembling input data packets, preferably joins the payload of the received data packets, read out of the payload memory, to form a payload sequence and then assembles this with a transmit data packet header, generated by the RISC processor, to form a transmit data packet.

The buffer management unit is preferably connected via a payload bus to the first data processing unit (reader), the second data processing unit (writer) and to the payload memory.

The RISC processor is preferably connected to a local data memory.

In a preferred embodiment, a local program memory is also provided, which is connected to the RISC processor.

In a preferred embodiment, a coprocessor is connected to the RISC processor.

In the further text, preferred embodiments of the multichannel processor according to the invention for processing data of multiprotocol data packets are described with reference to the attached figures for explaining features essential to the invention.

DETAILED DESCRIPTION

Figure 5:
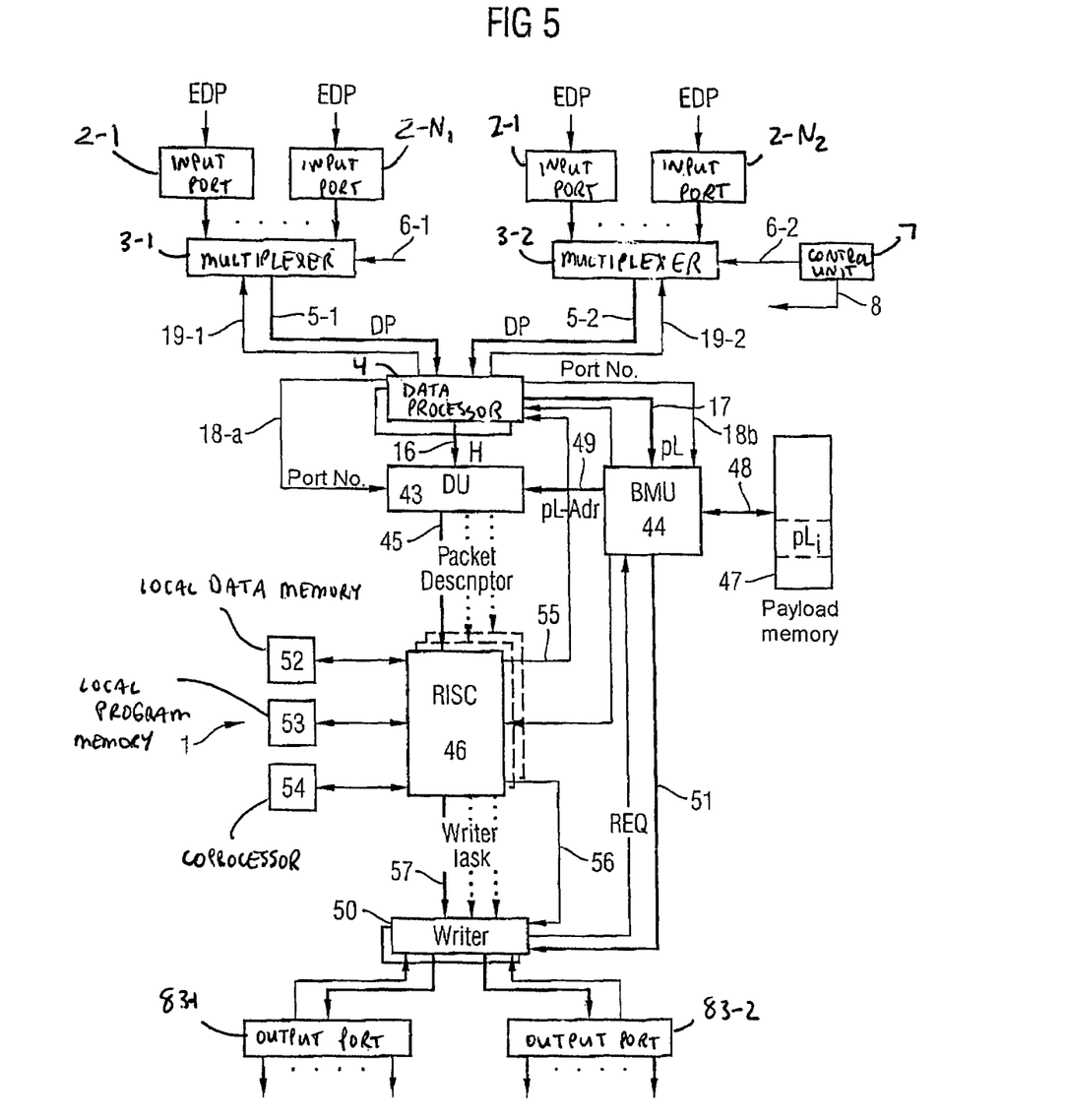
FIG. 5 shows a block diagram of the multichannel processor according to the invention.

As can be seen from FIG. 5, the multichannel processor 1 according to the invention for processing data of multiprotocol data packets comprises a multiplicity of input ports 2-*i* for receiving received data packets EDP. The input ports 2 are in each case connected to multiplexers 3 which switch a selected input port through byte by byte or, respectively, word by word to a subsequent first programmable data processing unit 4 via data lines 5. In the embodiment shown in FIG. 5 the multichannel processor 1 has two multiplexers 3, namely a multiplexer 3-1 for N1 logical links and a multiplexer 3-2 for N2 physical channels. The multiplexers 3 are driven by a control unit 7 of the multichannel processor 1 via control lines 6. The control unit 7 delivers an input port number to the multiplexer 3 and selects an input port for receiving the data packet which is received via a data transmission channel. The data packets in each case comprise data packet headers and data packet payloads. The selection of the input port by the control unit 7 can be effected in accordance with any selection method, for example by means of a round-robin arbitration. The input multiplexers 3 switch the data present serially through as data bytes or, respectively, data words to the subsequent first programmable data processing unit 4. As such, the first data processing unit 4 contains the port or data transmission channel number associated with the data word or data byte.

Figure 6:
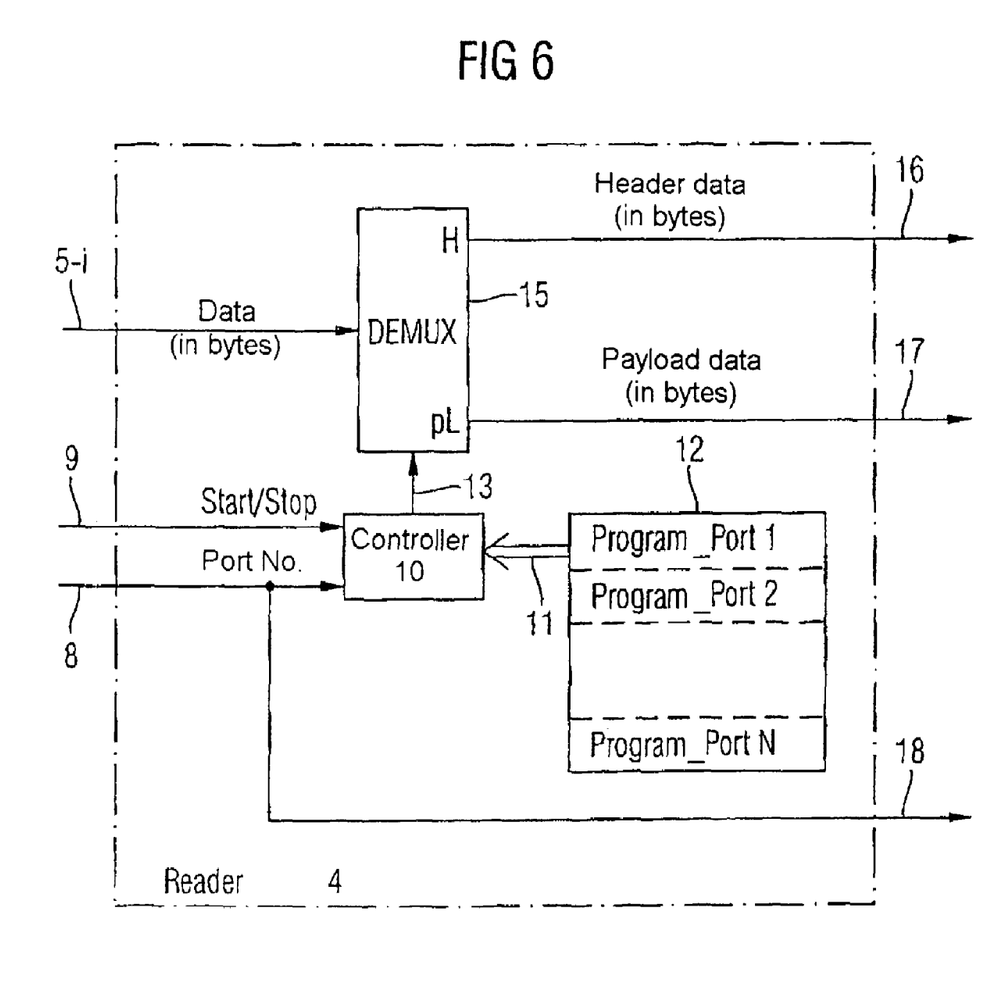
FIG. 6 shows a block diagram for explaining the operation of the first data processing unit in the multichannel processor according to the invention.

The operation of the first programmable data processing unit 4 is shown in principle in FIG. 6. The programmable data processing unit 4 or reader, respectively, receives data byte by byte from the multiplexers 3-*i* via data transmission lines 5-*i* from a port switched through. The associated port number is also delivered to the reader 4 by the multiplexer 3-*i*. In an alternative embodiment, the reader 4 receives the input port number via a control line 8 from the internal control unit 7. In addition, the reader 4 receives a start/stop signal, which indicates the beginning and the end of the data packet, via a control line 9. The programmable data processing unit 4 contains an internal controller 10 which is connected to an internal program memory 12 via lines 11. The program memory 12 contains various sorting programs for separating the data words or data bytes coming in via the data line 5. In the program memory 12, an associated sorting program is stored for each input port. The controller 10 receives the input port number and performs the associated sorting program stored in the program memory 12. In accordance with the sorting program, the controller 10 drives a demultiplexer 15 provided in the reader 4 via a control line 13. The demultiplexer 15 switches the incoming data words either as header data byte by byte to a data line 16 or as payload data to a data line 17 in dependence on the respective sorting program. The sorting programs stored in the program memory 12 specify whether the serially received data words are header data words or payload words.

A sorting program could contain, for example, the following instructions:
2 bytes header data,
2 bytes payload data,
1 byte header data,
1.023 bytes payload data.

According to this sorting program the first 2 bytes in the given example, which are received by a particular port, are switched through to line 16, the next 2 bytes are switched through to line 17 as payload data, the next data item is switched through to line 16 as header data item and the remaining 1.023 bytes are switched through to line 17 as payload data.

The input port number received via line 8 is delivered to the subsequent unit via a line 18. In the multichannel processor architecture according to the invention, the separation of the data packets into data packet header and data packet payload is thus done by the first data processing unit 4 and not by the RISC processor. Depending on the number of input ports 2 or, respectively, of multiplexers 3, a number of data processing units 4 or readers 4 can be provided in a preferred embodiment of the multichannel processor 1 according to the invention. The [lacuna] first data processing unit 4 can be done either during the configuration of the multichannel processor 1 or also dynamically during the ongoing operation. The first data processing unit 4 preferably has buffers for temporarily storing data. The first data processing unit 4 preferably indicates to the multiplexers 3 via indicating lines 19 whether there is still storage space in the buffers (back pressure).

Figure 7:
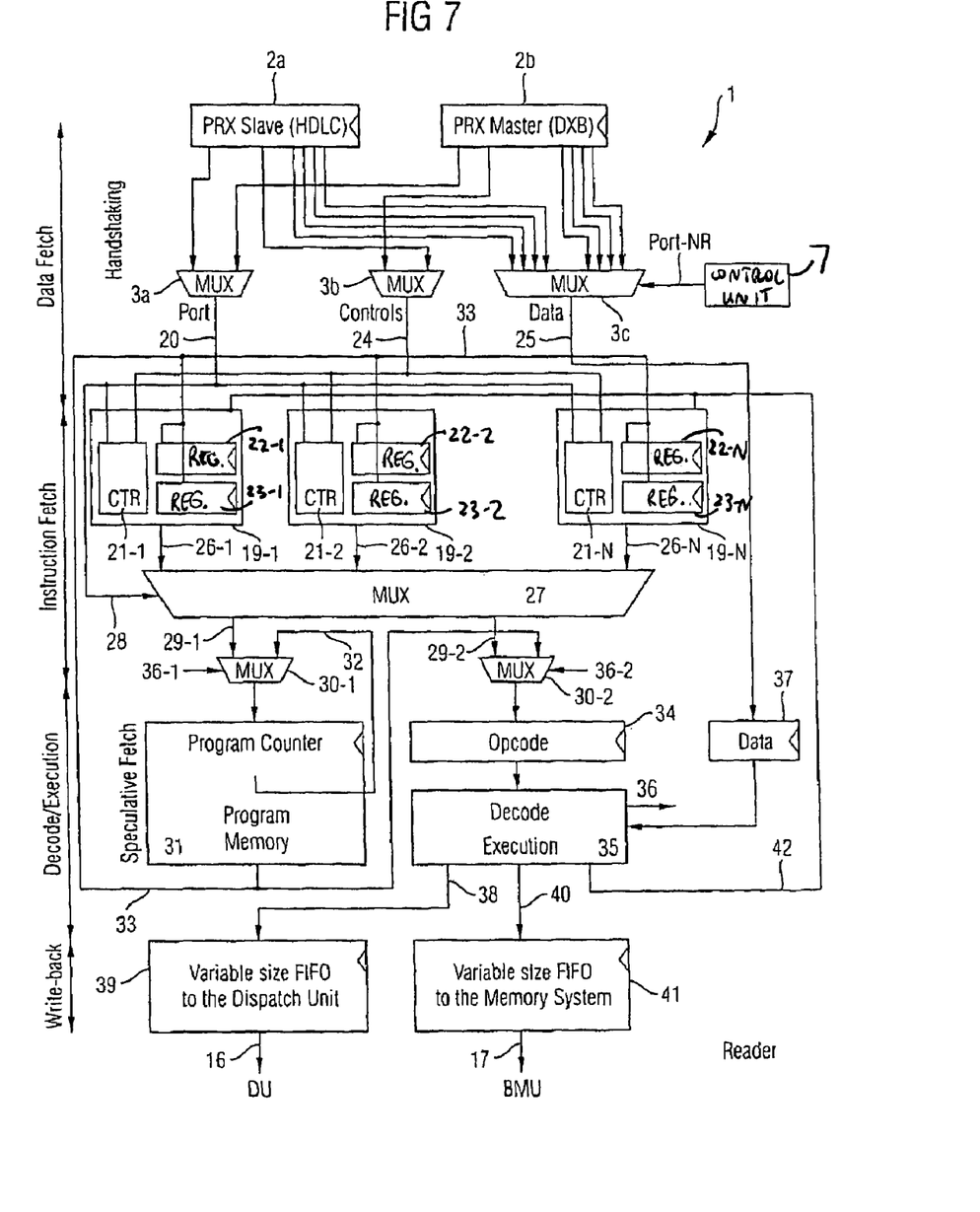
FIG. 7 shows a preferred embodiment of the first data processing unit within the multichannel processor according to the invention.

FIG. 7 shows a preferred implementation of the first data processing unit 4. The multichannel processor 1 has a PRX input port 2a and a PXR port 2b in the implementation shown in FIG. 7. If the multichannel processor 1 circuit is connected as shown in FIG. 2 and located in the UMTS node B, the PXR input port is connected to the radio network controller RNC via the data transmission lines. The multiplexer 3 is driven by the control unit 7 which selects the required port. The multiplexer 3a switches the port number through via a line 20 to N channel status memory units 19-1, 19-2, ..., 19-N, connected in parallel, which are provided for N data transmission channels. The channel status memory units 19 store the status of a data transmission channel or, respectively, its context or thread. For this purpose, each channel status memory unit 19 has a control unit (CTR) 21, a first register 22 as program counter PC and a second register 23 for the current program or opcode. The inputs of the channel status memory units 19 are connected via lines 24 to the output of the multiplexer 3c and receive data packet information or control signals such as, for example, an error bit, data indicating the end of the data packet (end of packet), and data indicating the beginning of a data packet (begin of packet). In addition, the channel status memory units 19 receive the packet data switched through from the multiplexer 3c via a data bus 25. The outputs of the data channel status memory unit or context memory 19 are connected via lines 26 to a multiplexer circuit 27 which receives the port number via a control line 28. The multiplexer circuit 27 has two outputs 29 which are connected to subsequent inputs of two multiplexers 30. The output of the multiplexer 30-1 is connected to a program memory 33 which has a program counter PC integrated therein, the program memory 31 applying to the program counter PC to the second input of the multiplexer 30-1 via a line 32. The second input of the other multiplexer 30-2 is connected to the output of the program memory 31 via a line 33.

The multiplexer 30-2 switches the program opcode, temporarily stored in the register 23 in the associated context memory unit 19, through into an opcode register 34 for a selected data transmission channel. The opcode temporarily stored in the opcode register 34 is decoded and executed by a program decoding unit 35. The decoding unit drives the multiplexer 30 via control lines 36 in dependence on the decoded opcode.

The instruction set for the opcode essentially comprises four instructions, namely:
forward data word as header data to descriptor unit;
deliver received data word as payload to buffer management unit;
deliver received data word both to descriptor generator unit and to buffer management unit;
delete received data word;

The opcode comprises two opcode bits for coding these four opcode instructions.

The program memory 31 contains the programmed-in programs for the various ports. The program memory 31 in FIG. 7 corresponds to the program memory 12 in FIG. 6. The associated stored program is run for each data transmission channel. As such, the current opcode read out in accordance with the program counter PC is loaded into the associated context unit 19 and the corresponding program counter PC is incremented. At the same time, the previous opcode is loaded onto the opcode register 34 for the decoding. The program memory 31 is connected to all context units 19 and to the second input of the multiplexer 30-2 via the program databus 33.

The data words delivered by the multiplexer 3c are temporarily stored in a data register 37 and supplied to the instruction execution unit 35. The output of the instruction execution unit 35 is connected via data lines 38 to a fixed buffer 39 and via data lines 40 to a second buffer 41. The buffers 39, 41 are preferably FIFO registers with variable storage size. In addition, the decoding unit 35 is connected to the context memories 19-i via data lines 42. In accordance with the opcode read out of the opcode register 34, which is decoded by the decoder unit 35 and then executed by an execution unit, the data buffered in the data register 37 are written as header data into the buffer 39 via the data lines 38 or as payload data into the buffer 41 via the data line 40. There are two other possibilities in that the data are deleted or delivered to the two FIFO registers 39, 41. The first buffer 39 is connected to the subsequent descriptor generator unit via data lines 16. The second buffer 41 is connected to the buffer management unit 44 of the multichannel processor 1 via data lines 17.

The preferred embodiment of the first data processing unit 4 shown in FIG. 7 performs a four-stage data processing operation, namely the data fetch via the input ports 2 and the multiplexer 3, fetching of the program instruction by means of the port number by the context unit 9 and the multiplexers 27, 30, decoding of the selected opcode and its execution by the unit 35 and the writing of the data into the FIFO registers 39, 41 in accordance with the executed instruction. By using the respective channel context or the associated channel context unit 19 for the selected port or data transmission channel, a multiplicity of data packets from different data transmission channels can be processed at the same time. The sorting or data processing programs stored in the program memory 31 for each data transmission channel can be programmed either statically during the configuration or during ongoing operation by the RISC processor provided in the multi-channel processor 1. This greatly increases the operational flexibility of the multichannel processor 1 according to the invention.

As can be seen from FIG. 5, the first data processing unit 4 is followed by a descriptor generator unit 43 and a buffer management unit 44. The descriptor generator unit 43 is shown diagrammatically in FIG. 8. The descriptor generator unit or distribution unit 43 is arranged between the first data processing unit 4, the subsequent RISC processor 46 and the buffer management unit 44. The distribution unit 43 buffers the data words delivered by the reader 4 via the data lines 16 and assembles them to form data packet descriptors or generates these data packet descriptors. At the output end, the distribution unit 43 is connected to an associated RISC processor 46 via data lines 45. The buffer management unit 44 delivers localization data or memory address data to the distribution unit 43 via data lines 49.

Figure 8:
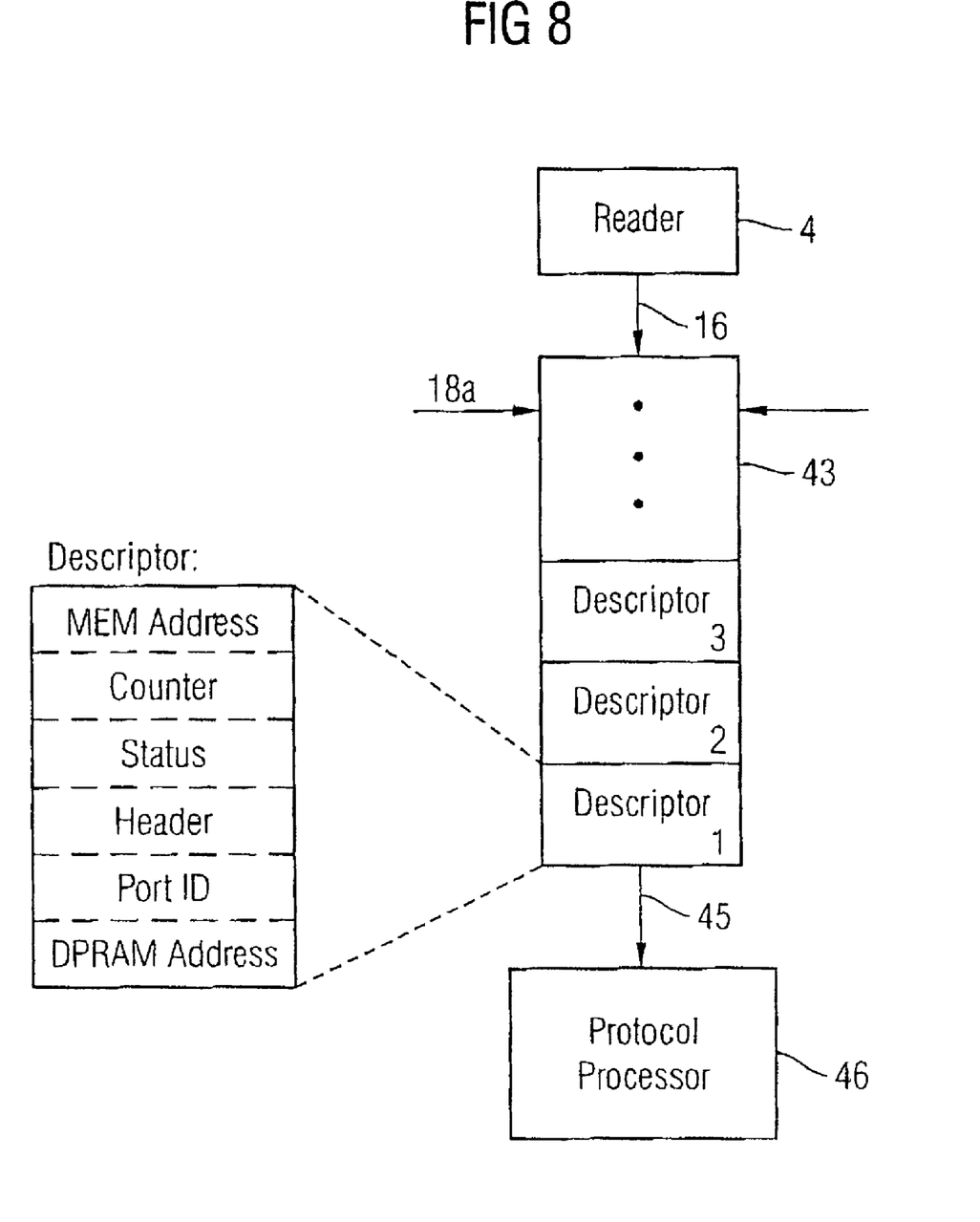
FIG. 8 shows a preferred embodiment of the descriptor generator unit contained in the multichannel processor according to the invention.

As can be seen from FIG. 8, a temporarily stored descriptor contains, apart from the memory address (MEM address) of the associated payload, a counter, status bits, header data and the associated port number. The descriptor generator unit 43 can be optionally connected to an additional dual-port RAM memory (DPRAM) which stores additional data for a header. As an alternative, a header pointer which points to the associated header data within a memory can be provided in the descriptor instead of the header data within the descriptor. The descriptors formed are delivered by the distribution unit 43 via the data lines 45 to the RISC processor 46 for data processing.

Figure 9:
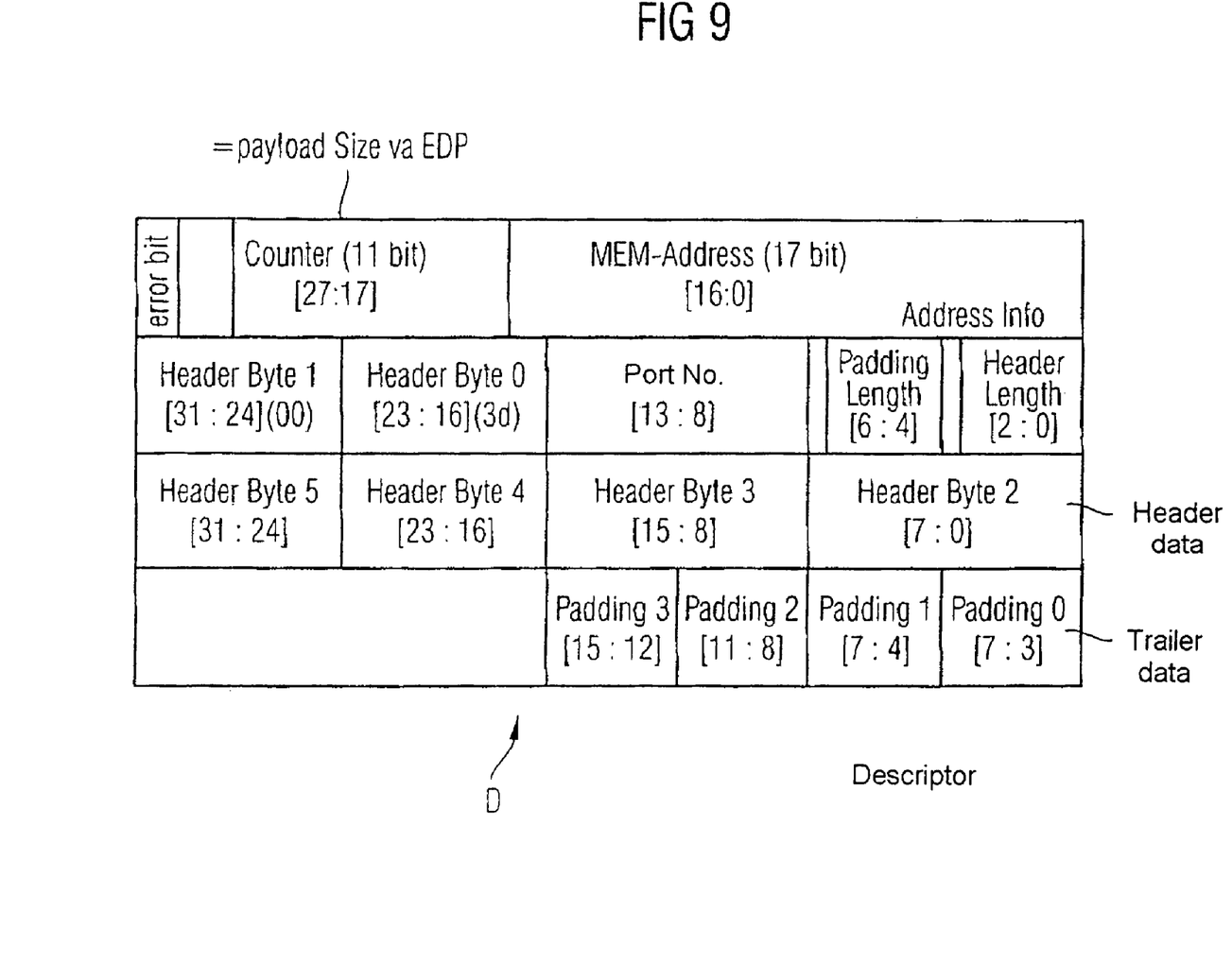
FIG. 9 shows a preferred data structure for a descriptor generated by the descriptor unit.

FIG. 9 shows a preferred data structure of a descriptor D temporarily stored in the distribution unit 43. The descriptor D contains an error bit as status information, a counter which inputs the data volume of the payload of the input packet, a memory address for the associated payload in the payload memory, the input port number and storage space for a number of bytes on data packet management data or, respectively, header data. In the example shown in FIG. 9, storage space is provided for 6 bytes of header data. In the example shown in FIG. 9, the descriptor D contains 3 bits which specify the number of header data bytes (header length), with a 3-bit-long field for coding the number of header bytes, a maximum of 8 header bytes can be stored in the descriptor D. In addition, the descriptor D comprises trailor [sic] data of the received data packet (padding 0 to padding 3), the number of padding data fields being specified by a 3-bit-long field (padding length). In the example shown in FIG. 9, the descriptor D comprises four rows of 32 bits each. The distribution unit 43 is capable of filtering out invalid received data packets by means of status bits, particularly by means of the error bit.

The RISC processor 46 following the distribution unit 43 generates, in dependence on the received data packet descriptors D, payload processing instructions (writer task) for processing the payload of the received data packets EDP, which are stored in a data memory 47 by means of the buffer management unit 44. The buffer management unit 44 is connected to the payload memory 47 via data lines 48. The buffer management unit 44 writes the payload words of the received data packet, received via data lines 17, into the addressable payload memory 47 and delivers the associated localization data or memory addresses to the distribution unit 43 via lines 49. The buffer management unit 44 stores the payload delivered by the first data processing unit 4 and delivers it, if required, to a second programmable data processing unit 50, following the RISC processor 46, via a data bus 51.

In a preferred embodiment, the RISC processor 46 is connected to a local data memory 52, a local program memory 53 and a coprocessor such as, for example, a CAM (Content Addressable Memory). The data exchange between the first programmable data processing unit 4 and the buffer management unit 44 and between the buffer management unit 44 and the second programmable data processing unit 50 takes place via a separate data bus 17, 51, without the data from the local data memory 52 having to be transferred to the RISC processor 46. This leads to a significant saving in the power consumption of the multichannel processor 1. The RISC processor 46 is connected to the first data processing unit 4 via programming lines 55 and to the second programmable data processing unit 50 via programming lines 56. The RISC processor 46 writes reader programs into the program memory 31 of the first data processing unit 4 via the programming lines 55 as shown in FIG. 7. In the same manner, the RISC processor 46 is capable of writing wirter [sic] programs into the second data processing unit 50. The RISC processor 46 generates, in dependence on the data packet descriptors received for lines 45, payload processing instructions for processing the data packet payload words of the received data packets, stored in the payload memory 47. These payload processing instructions or writer tasks are delivered to the second programmable data processing unit 50 via lines 57. The data processing by the RISC processor 46 consists, for example, in fragmenting large data packets to form small data packets or in assembling small data packets to form large data packets. The RISC processor 46 is provided for generating the header data for the transmit data packets on the basis of the data packet descriptors supplied to it. During the fragmenting or assembling, the RISC processor reads in the start address (Mem adr) of the payload associated with the received data packet (Memsize) and the header data of the received data packet and calculates from these the new start address or addresses of the transmit data packets, their packet length and the new header data for the transmit data packets.

Figure 10:
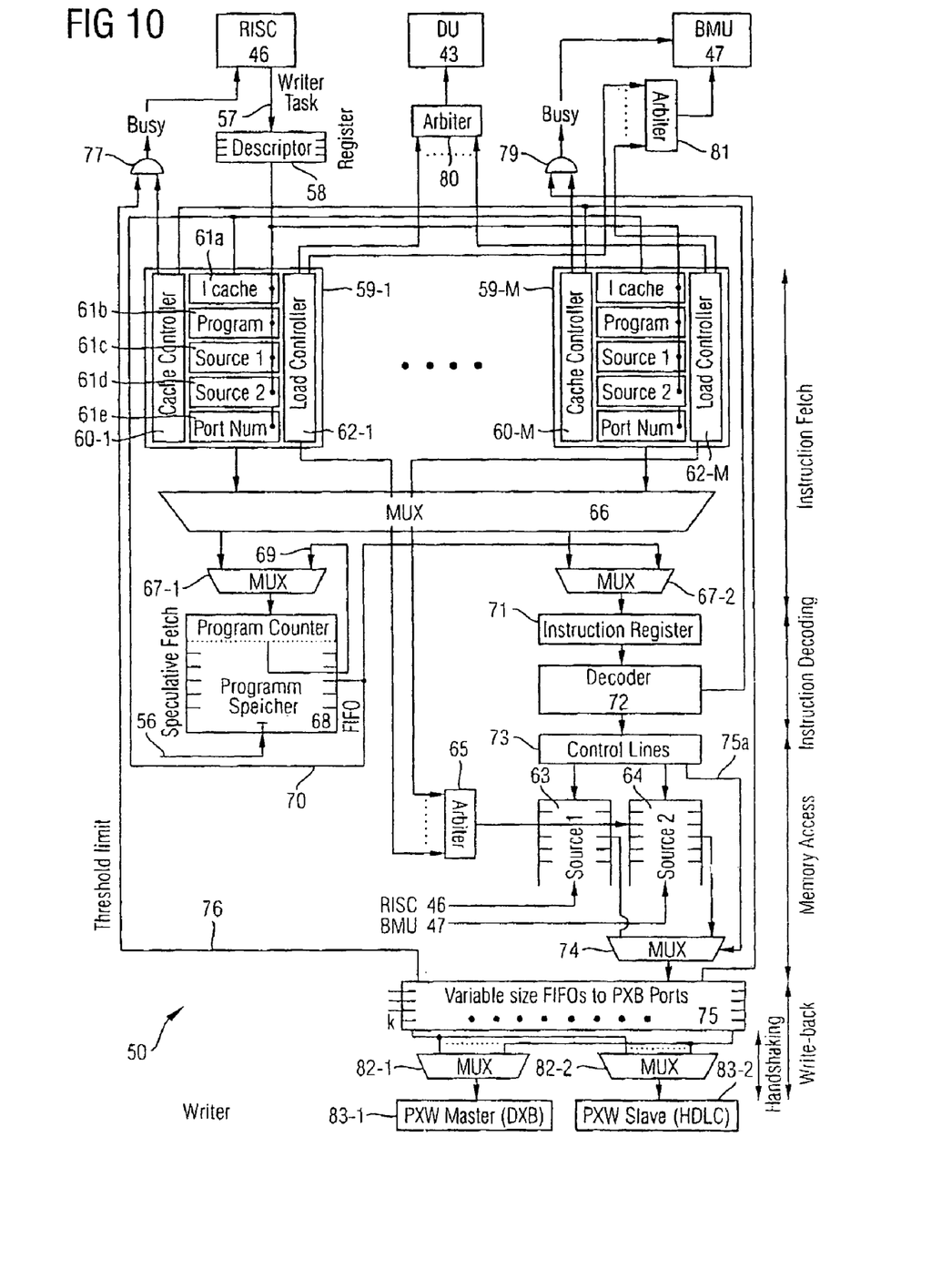
FIG. 10 shows a preferred embodiment of the second data processing unit provided in the multichannel processor according to the invention.

FIG. 10 shows a preferred implementation of the second programmable data processing unit 50 (writer), shown in FIG. 5.

The second programmable data processing unit 50 of the multichannel processor 1 comprises a register 58 for receiving the writer tasks from the RISC processor 46 via the lines 57.

A writer task essentially comprises the following data:
a port number for the output port,
a flag BOP (beginning of packet) which indicates the beginning of a data packet,
a flag EOP (end of packet) which indicates the end of a data packet,
a start address of the payload stored in the payload memory 47 for the data packet (MEMadr),
information about the volume of the payload stored (MEMsize),
the program address of the associated writer program in a program memory of the second programmable data processing unit 50 and an error flag which indicates an invalid data packet.

The data processing unit 5 has a number of data channel writer context buffers 59, the number N of data channel writer context buffers 59 being less than or equal to the maximum number of output ports of the multichannel processor 1. Each data transmission channel writer context memory 59 comprises a cache controller 60, a number of registers 61 and a load controller 62. Preferably, five registers 61*a*, 61*b*, 61*c*, 61*d*, 61*e* are provided in each writer context buffer 59. The first register 61*a* stores the current opcode of the writer program, register 61*b* stores the program counter, register 61*c* stores a first pointer, register 61*d* stores a second pointer and the fifth register 61*e* stores the output port number.

The data processing unit 50 has a first local buffer 63 and a second local buffer 64. The first local buffer 63 receives the processed header data H' from the RISC processor 46 and buffers them sequentially. The second buffer 64 receives the payload from the buffer management unit 47 via the data bus 51. The data stored in the buffers 63, 64 are accessed via an arbiter 65 in dependence on the pointers or address vectors stored in registers 61*c*, 61*d*.

The data processing unit 50 contains a multiplexer circuit 66, the inputs of which is [sic] in each case connected to an output of a data channel writer context memory unit 59. The multiplexer circuit 66 has two outputs which are connected to subsequent multiplexers 67. The output of the first multiplexer 67-1 is connected to a program memory 68 of the programmable data processing unit 50. The program memory 68 can be programmed by the RISC processor via the program lines 56. The program memory 68 contains a number of writer programs for the different output ports. The program memory 68 contains a program counter which is connected to the second input of the multiplexer 67-1 via a line 69. The opcodes or program instructions read out of the program memory 68 are written into the instruction register 61-*i* of the associated output port via a line 70 and are buffered there. The previous opcode is loaded into an instruction register 71 by the multiplexer 66 and the multiplexer 67-2. The opcode buffered in the instruction register 71 is decoded by a decoding device 72 and executed. The decoded control data are loaded into a control data register 73 by the decoding device 72, the control data driving the two buffers 63, 64 and, via a control line 75, a multiplexer 74.

The processed header data H' buffered in the buffer 63 and the payload received from the buffer management unit 44 are assembled by the multiplexer 74 to form transmit data packets in accordance with the control data buffered in the control register 73. The assembled transmit data packets are delivered by the multiplexer 74 to a subsequent FIFO memory 75 with variable memory size.

The output buffer 75 indicates to the preceding RISC processor, via a first indicating line 76 and a gate 77, that the buffer 75 is full and any further transmission of header data to the buffer 63 must be interrupted. In addition, the output buffer 75 indicates to the buffer management unit 44 via a second indicating line 78 and a gate 79 that, at present, there should be no transmission of further payload data into the buffer 64. The data channel writer context buffers 59 indicate the current operating state to the distribution unit 43 and the buffer management unit 47 via indicating lines and arbiter circuits 80, 81. The output buffer 75 for the transmit data packets is connected to the output ports 83 of the multichannel processor 1 via multiplexer 82.

Like the reader 4, the writer 50 performs pipeline data processing with a number of phases, namely fetching the program instruction, decoding the program instruction, accessing the stored data and outputting the transmit data packets.

Whilst the reader 4 separates the header data for received data packets from their payload, the writer 50 newly assembles transmit data packets from processed header data and buffered payload. The transmit data packets can be either smaller or larger than the receive data packets. The RISC processor 46 is capable of dynamically programming both the writer 50 and the reader 4. The dynamic programming of the writer 50 can be performed newly for each transmit data packet.

The main task of the RISC processor 46 consists in processing the data packet descriptors D supplied by the distribution unit 43. The RISC processor 46 can be programmed in such a manner that it handles the following tasks or a combination of these, namely demultiplexing the incoming data packets in accordance with the input port number, the protocol identifier or the header data, processing header data, removing header data or inserting new header data, fragmenting data packets into smaller data packets or assembling a number of data packet fragments to form a large data packet, re-ordering a sequence of data packets and prioritizing data packets during the data forwarding.

This can be performed by the RISC processor 46 by means of the local data memory 52 without the payload memory 47 being accessed. There is no bus link between the RISC processor 46 and the payload memory 47. For processed data packets, the RISC processor sends a writer task to the second programmable data processing unit 50. The RISC processor 46 is connected, for example, to a coprocessor 54 in the form of a CAM memory which assists the RISC processor 46 during demultiplexing and classifying operations.

In the computer architecture according to the invention, the functions necessary during multichannel-multiprotocol data processing are separated into computing-intensive data processing operations such as parsing, data field extraction and the like and the buffer management functions with low latency such as allocation, data recovery and the like. The computer architecture according to the invention for a multichannel-multiprotocol processor 1 offers high flexibility in the data processing of various data packet formats and data packet protocols, with comparatively low circuit complexity.

LIST OF REFERENCE DESIGNATIONS

1 Multichannel processor
2 Input ports
3 Multiplexer
4 First programmable data processing unit (reader)
5 Lines
6 Control lines
7 Control unit
8 Control line
9 Control line
10 Controller
11 Data lines
12 Programmable memory
14 Control lines
15 Demultiplexer
16 Header data lines
17 Payload data lines
18 Control line
19 Indicating line
20 Control line
21 Controller
22 Register 23 Register
24 Control lines
25 Data lines
26 Lines
27 Multiplexer circuit
28 Control lines
29 Lines
30 Multiplexer
31 Program memory
32 Line
33 Line
34 Instruction register
35 Coding unit
36 Control line
37 Data register
38 Line
39 Buffer
40 Line
41 Buffer
42 Line
43 Distribution unit
44 Buffer management unit
45 Lines
46 RISC processor
47 Bus data memory
48 Lines
49 Line
50 Second programmable data processing unit (writer)
51 Data lines
52 Local data memory
53 Local program memory
54 Coprocessor
55 Programming lines
56 Programming lines
57 Lines
58 Register
59 Data channel context memory
60 Cache controller
61 Context register
62 Load controller
63 Input buffer
64 Input buffer
65 Arbiter
66 Multiplexer circuit
67 Multiplexer
68 Program memory
69 Line
70 Line
71 Instruction register
72 Decoding circuit
73 Control data register
74 Multiplexer
75 Output buffer
76 Indicating line
77 Gate
78 Indicating line
79 Gate
80 Arbiter
81 Arbiter
82 Multiplexer
83 Output ports

The invention claimed is:

1. An arrangement for processing data of multiprotocol data packets, comprising:
 (a) a plurality of input ports for receiving received data packets in parallel;
 (b) at least one multiplexer connected to the input ports, the at least one multiplexer configured to switch through the data present at a selected input port word by word;
 (c) at least one first programmable data processing unit configured to separate a sequence of data words from different input ports into data packet header words and into data packet payload words in accordance with a sorting program;
 (d) a buffer management unit configured to write the data packet payload words of a received data packet into an addressable payload memory and further configured to generate localization data which specifies a corresponding memory area of the payload memory;
 (e) a descriptor generator unit for generating data packet descriptors which in each case contain a header assembled from the data packet header words and the localization data for the associated payload of the received data packet;
 (f) a RISC processor configured to generate, in dependence on the data packet descriptors, header data for transmit data packets and payload processing instructions for processing data of the data packet payload words, stored in the payload memory, of the associated received data packet; and
 (g) at least one second programmable data processing unit configured to process the payload words from the payload memory in accordance with the payload processing instructions and assembles the payload words with the header data to form transmit data packets.

2. The arrangement of claim 1, wherein the RISC processor is further operable to generate headers for the transmit data packets in dependence on the data packet descriptors.

3. The arrangement of claim 1, wherein each of the at least one first programmable data processing unit includes a program memory.

4. The arrangement of claim 1, wherein the at least one first programmable data processing unit is configured to be programmed by the RISC processor.

5. The arrangement of claim 4, wherein the at least one first programmable data processing unit is configured to be programmed during processor configuration.

6. The arrangement of claim 4, wherein the at least one first programmable data processing unit is configured to be programmed during the ongoing processor operation.

7. The arrangement of claim 1, wherein the descriptor generator unit is further configured to mark an invalid received data packet using a corresponding entry in the data packet descriptor.

8. The arrangement of claim 1, wherein the second programmable data processing unit is configured to, in accordance with the payload processing instructions, form a payload sequence with the payload words from a plurality of received data packets, and assemble the payload sequence with a first transmit data packet header generated by the RISC processor to form a first transmit data packet.

9. The arrangement of claim 1, wherein the buffer management unit is connected via a payload bus to the first programmable data processing unit, the second programmable data processing unit and to the payload memory.

10. The arrangement of claim 1, further comprising a local data memory is connected to the RISC processor.

11. The arrangement of claim 1, further comprising a local program memory is connected to the RISC processor.

12. The arrangement of claim 1, further comprising a coprocessor is connected to the RISC processor.

13. The arrangement of claim 1, wherein the at least one first programmable data processing unit is further configured to separate a sequence of data words having different protocols from different input ports into data packet header words and into data packet payload words in accordance with a sorting program.

14. An arrangement for processing data of multiprotocol data packets, comprising:
(a) a plurality of input ports for receiving received data packets in parallel;
(b) a plurality of multiplexors connected to the input ports, at least one multiplexer in the plurality being configured to switch through the data present at a selected input port word by word;
(c) a plurality of first programmable data processing units configured to separate a sequence of data words from different input ports into data packet header words and into data packet payload words in accordance with a sorting program;
(d) a buffer management unit configured to write the data packet payload words of a received data packet into an addressable payload memory and further configured to generate localization data which specifies a corresponding memory area of the payload memory;
(e) a descriptor generator unit for generating data packet descriptors which in each case contain a header assembled from the data packet header words and the localization data for the associated payload of the received data packet;
(f) a RISC processor configured to generate, in dependence on the data packet descriptors, header data for transmit data packets and payload processing instructions for processing data of the data packet payload words, stored in the payload memory, of the associated received data packet; and
(g) a plurality of second programmable data processing units configured to process the payload words from the payload memory in accordance with the payload processing instructions and to assemble the payload words with the header data to form transmit data packets.

15. A method of processing data of multiprotocol data packets, the method comprising:
(a) separating a sequence of data words from a plurality of different input ports into data packet header words and into data packet payload words in accordance with a sorting program;
(b) writing the data packet payload words of a received data packet into an addressable payload memory;
(c) generating localization data which specifies a corresponding memory area of the payload memory in which the data packet payload words are written;
(d) generating data packet descriptors which in each case contain a header assembled from the data packet header words and the localization data for the associated payload of the received data packet;
(e) employing a RISC processor to generate, in dependence on the data packet descriptors, header data for transmit data packets and payload processing instructions for processing data of the data packet payload words, stored in the payload memory, of the associated received data packet; and
(f) processing the payload words from the payload memory in accordance with the payload processing instructions; and
(g) assembling the payload words with the header data to form transmit data packets.

16. The method of claim 15 wherein step (f) further comprising using a separate processor to process the payload words.

17. The method of claim 15 wherein step (a) further comprises separating a sequence of data words having different protocols from different input ports.

18. The method of claim 15 further comprising marking an invalid received data packet using a corresponding entry in the data packet descriptor.

19. The arrangement of claim 1, further comprising:
(h) a number of output ports for outputting the transmit data packets in parallel; and
(i) at least one demultiplexer configured to switch the transmit data packets through to a selected one of the number of output ports.

20. The arrangement of claim 19, characterized in that a control unit is provided which delivers the input port number to the multiplexer and the output port number to the demultiplexer.

21. The arrangement of claim 1, wherein the arrangement comprises a first multiplexor for a number N1 of first physical channels and a second multiplexor for a number N2 of second physical channels.

22. The arrangement of claim 1, wherein the multiplexor delivers a port number to said first programmable data processing unit, the port number being associated to the data delivered by the multiplexor.

23. The arrangement of claim 1, wherein an internal control unit is provided, which delivers a port number to said first programmable data processing unit, the port number being associated to the data delivered by the multiplexor.

* * * * *